United States Patent [19]

Kaartinen et al.

[11] 4,248,259
[45] Feb. 3, 1981

[54] FLUID FLOW CONTROL DEVICE

[75] Inventors: Niilo H. Kaartinen; Pentti J. Juhala, both of Kuusisto, Finland

[73] Assignee: Packard Instrument Company, Inc., Downers Grove, Ill.

[21] Appl. No.: 797,305

[22] Filed: May 16, 1977

[51] Int. Cl.³ .............................................. F16K 49/00
[52] U.S. Cl. .................................... 137/334; 137/341; 62/3; 62/66; 62/73; 165/61
[58] Field of Search .................... 165/61, 30; 137/334, 137/341, 803, 828, 13; 251/369; 62/3, 66, 73

[56] References Cited
U.S. PATENT DOCUMENTS

| | | | |
|---|---|---|---|
| 2,646,065 | 7/1953 | Tyson | 137/341 X |
| 2,723,108 | 11/1955 | Butler et al. | 62/66 X |
| 3,399,536 | 9/1968 | Walz | 62/3 |

*Primary Examiner*—Albert W. Davis
*Attorney, Agent, or Firm*—Leydig, Voit, Osann, Mayer & Holt, Ltd.

[57] ABSTRACT

A fluid flow control device includes a thermally conductive conduit section having both interior and exterior heat exchange surfaces, with the interior surface being adapted to contact fluid flowing thereover. A controllable heat transfer means coupled to the conduit section has a first operative state for removing heat from the exterior heat exchange surface to reduce the temperature of the conduit section sufficiently to freeze liquid adjacent the interior heat exchange surface and thereby at least partially restrict the flow of fluid thereover. In a second operative state, the heat transfer means supplies heat to the interior heat exchange surface to melt at least a portion of any frozen liquid adjacent the interior heat exchange surface and thereby permit the flow of fluid thereover. In one exemplary embodiment of the invention, the heat transfer means includes a heat sink for receiving and dissipating heat removed from the conduit section, and a thermal electric heat pump controls the flow of heat to and from the conduit section. In another exemplary embodiment of the invention, the heat transfer means includes a heat sink and one or more electrical resistance heaters for heating the liquid adjacent the interior heat exchange surface.

2 Claims, 7 Drawing Figures

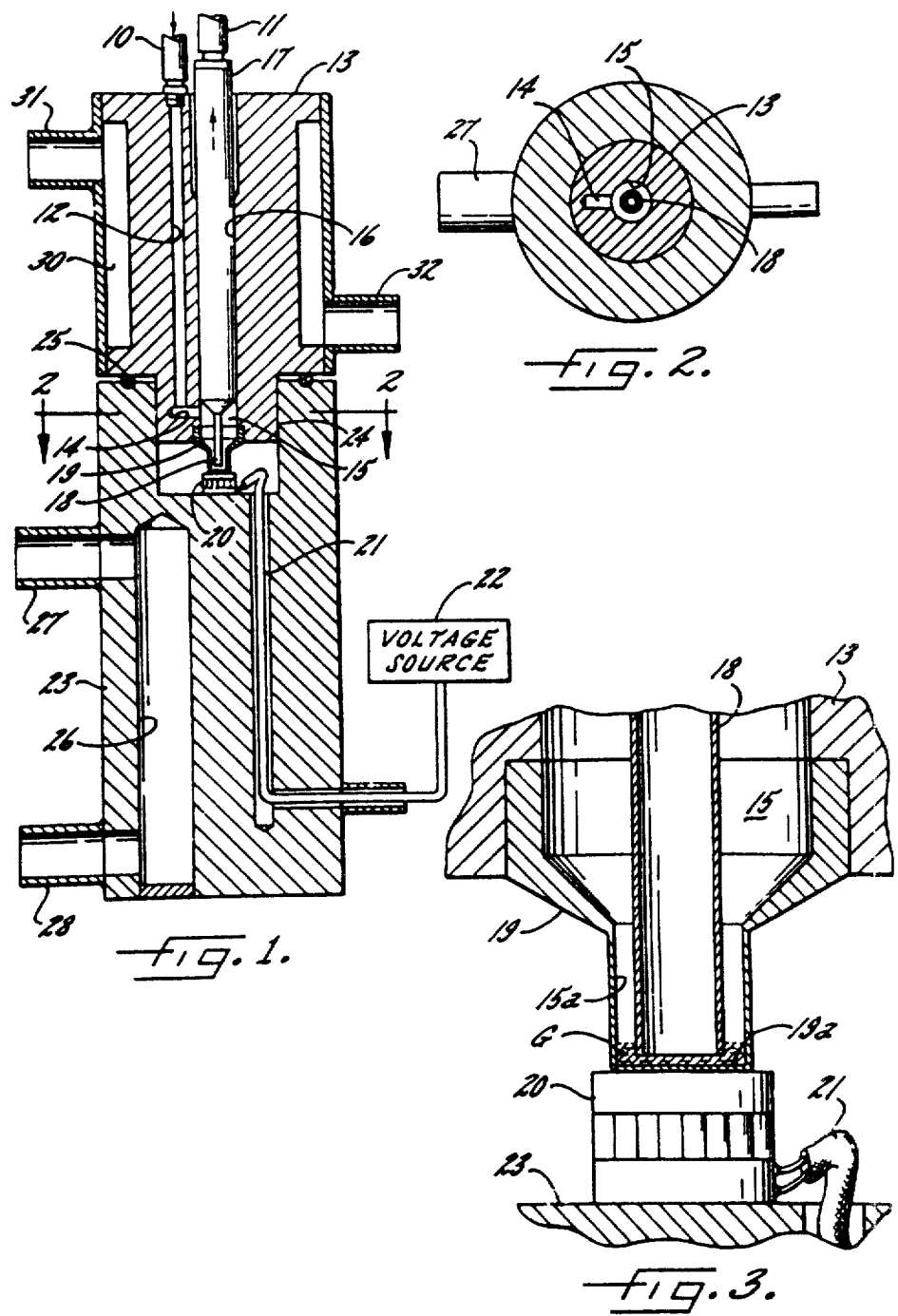

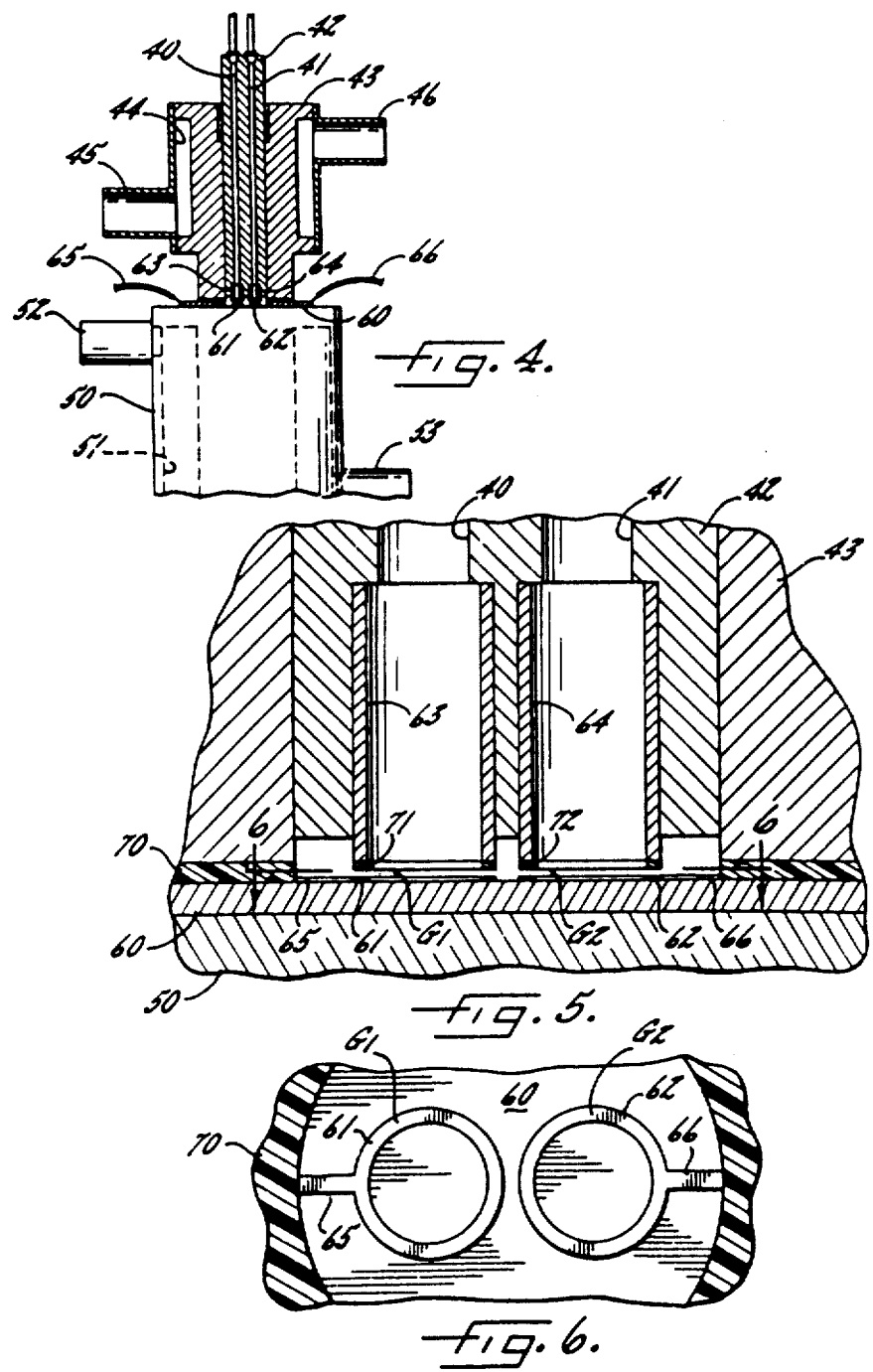

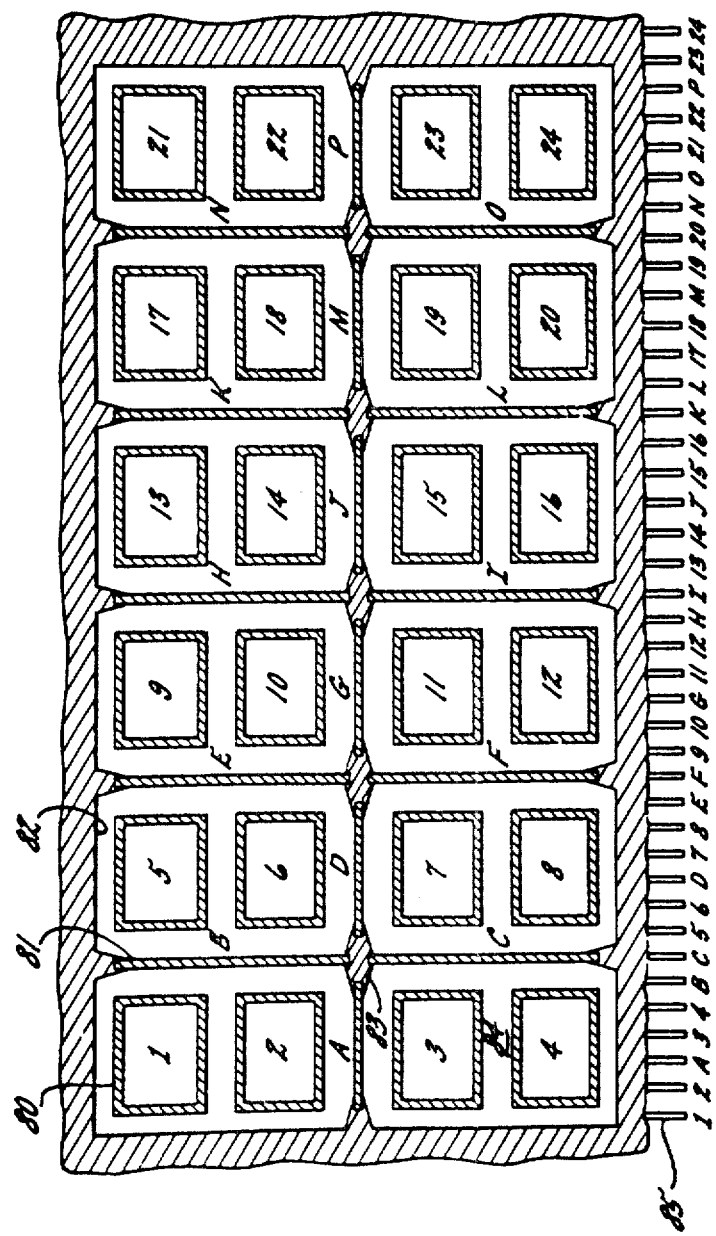

FLUID FLOW CONTROL DEVICE

DESCRIPTION OF THE INVENTION

The present invention relates generally to control devices such as valves for controlling fluid flow.

It is a principal object of the present invention to provide an improved fluid flow control device which has no moving parts. In this connection, a related object of the invention is to provide such an improved fluid flow control device which has no seals between moving parts so that it is absolutely leak-proof.

It is another important object of the invention to provide an improved fluid flow control device of the foregoing type that is ideally suited for controlling the flow of fluids containing radioactive materials. Thus, one specific object of the invention is to provide such an improved control device which is capable of providing continuously smooth and uninterrupted walls in the fluid passageway so that there are no crevices or dead spaces within which radioactive materials can be trapped. Thus, a related object of the invention is to provide such an improved device which is capable of controlling the passage of radioactive fluids with virtually no radioactive "memory" within the control device.

Yet another object of the invention is to provide such an improved fluid flow control device which can be made extremely compact, so that a number of such control devices can be accommodated within a small space if desired.

A still further object of the invention is to provide such an improved fluid flow control device which is easily controllable by electrical signals.

Another object of the invention is to provide such an improved fluid flow control device which is extremely fast acting so that it can be opened and closed almost instantaneously.

Still another object of the invention is to provide such an improved fluid flow control device that is capable of controlling the flow of both gases and liquids.

It is also an object of the invention to provide such an improved fluid flow control device which permits even complex multi-port valve matrices to be efficiently and economically manufactured.

Other objects and advantages of the invention will be apparent from the following detailed description and the accompanying drawings, in which:

FIG. 1 is a vertical section of a liquid control device embodying the present invention;

FIG. 2 is a section taken substantially along line 2—2 in FIG. 1;

FIG. 3 is an enlarged view of the central portion of the apparatus as illustrated in FIG. 1;

FIG. 4 is a side elevation, partially in section, of an alternative embodiment of the invention;

FIG. 5 is an enlarged view of the central portion of the device shown in FIG. 4;

FIG. 6 is a fragmentary section taken generally along line 6—6 in FIG. 5; and

FIG. 7 is a partially schematic top plan view of a multi-port valve embodying the invention.

Although the invention will be described in connection with certain preferred embodiments, it will be understood that it is not intended to limit the invention to these particular embodiments. On the contrary, it is intended to cover all alternatives, modifications and equivalents that may be included within the spirit and scope of the invention as defined by the appended claims.

Turning now to the drawings, there is illustrated a liquid flow control device for regulating the rate of liquid flow between a pair of conduits 10 and 11. This device is capable of reducing the rate of liquid flow between the conduits 10 and 11, or of terminating the flow completely.

The liquid from the conduit 10 enters the control device through a longitudinal feed passageway 12 formed in an upper housing 13. From the longitudinal passageway 12, the liquid flows through a transverse passageway 14 into an annular chamber 15 formed at the lower end of a central bore 16 containing an exit tube 17 extending longitudinally through the housing 13. This annular chamber 15 conducts the liquid into a flared cup 19 which closes the end of the bore 16 and forms a smaller annular chamber 15a around a restricted tube 18 formed on the lower end of the exit tube 17. The liquid flows downwardly through this chamber 15a, across the bottom wall 19a of the cup 19, and then upwardly into the tube 18 and on through the exit tube 17 to the output line 11.

In accordance with one important aspect of the present invention, the liquid input/output passageways are interconnected through a temperature-controlled gate region having means for reducing the temperature of the gate region sufficiently to freeze liquid therein and thereby at least partially restrict the flow of fluid through the gate region, and an electrically controllable means for increasing the temperature of the gate region sufficiently to melt frozen liquid therein and thereby at least partially open the gate region to permit fluid flow therethrough. Thus, in the illustrative embodiment, a controllable heat pump 20 is coupled to the exterior surface of the bottom wall 19a of the flared cup 19, so that the region G between the cup bottom wall 19a and the lower end of the tube 18 is the temperature-controlled gate region. This heat pump 20 has a first operative state for reducing the temperature of the bottom wall of the cup 19 sufficiently to freeze liquid in the gate region G and thereby at least partially restrict the flow of liquid therethrough, and a second operative state for increasing the temperature of the bottom wall of the cup 19 sufficiently to melt frozen liquid in the gate region G and thereby permit controlled flow of liquid therethrough.

The illustrative heat pump 20 is a thermoelectric device which is capable of transferring heat to and from the gate region G in response to electrical signals supplied through an electrical line 21 leading to a voltage source 22. One example of a thermoelectric heat pump suitable for this purpose is the Model 5AD cooler manufactured by Nuclear Systems, Inc. of Garland, Texas. While the upper surface of the thermoelectric heat pump 20 is in firm engagement with the cup bottom wall 19a, the lower surface of the heat pump 20 engages a heat sink formed by a lower housing 23. This lower housing is connected to the upper housing 13 by a threaded connection 24, with an O-ring 25 seated between the two housing 13 and 23 to prevent and fluid flow through the interface between the two housings.

In order to cool the lower housing 23 to a temperature sufficiently low to enable it to function as a heat sink, a refrigerant is passed through a cooling chamber 26 therein, with the refrigerant entering the chamber 26 through an inlet port 27 and exiting through an outlet port 28. This refrigerant is preferably regulated to maintain the lower housing 23, and thus the lower surface of the heat pump 20, at a temperature at least 20° C. below the freezing point of the liquid to be controlled. When the liquid to be controlled is water, a suitable temperature for the lower housing 23 is −20° C.

In accordance with a further feature of the invention, the liquid approaching the temperature-controlled gate region G is pre-cooled to a temperature only slightly above the freezing point of the liquid. Thus, in the illustrative embodiment, the upper housing 13 is maintained at a temperature sufficiently low to cool the liquid passing through the feed passageway 12 to a temperature that is less than about 1° C. above the freezing point of the liquid. To maintain the upper housing 13 at the desired temperature, a suitable refrigerant is passed into a cooling chamber 30 through an inlet 31, exiting through an outlet 32. This pre-cooling of the liquid before it encounters the temperature-controlled bottom wall of the flared cup 19 facilitates the freezing of the liquid in a minimum time interval.

The heat pump 20 transfers heat from the bottom wall of the thermally conductive flared cup 19 to the heat sink 23 extremely rapidly, thereby quickly freezing all or a portion of the liquid within the gate region G. Thus, the frozen liquid itself serves as the controllable valving element. The rate at which heat is transferred from the bottom wall of the cup 19 to the heat sink 23 depends on the temperature differential between the bottom wall and the heat sink, the thermal conductivity of the metal forming the cup 19 and the heat sink 23 and their interfaces with the heat pump 20, the characteristics of the heat pump, and the amount of electrical current supplied to the thermoelectric heat pump. In a typical application where the liquid is pre-cooled to within 1° C. of its freezing point and the heat sink is maintained at a temperature at least 20° C. below the freezing point of the liquid, the liquid can be frozen across a gap of about 0.1 to .05 millimeter in less than one second using the illustrative system with water flowing through the gate region at a rate of 50 ml/min.

By controlling the rate at which heat is transferred from the bottom wall of the thermally conductive cup 19 to the heat sink 23, the thickness of the layer of frozen liquid in the gate region G can be regulated to either partially or totally restrict the flow of fluid through the gate region. Thus, it can be seen that a continuously variable valving action is provided by regulating the rate of heat transfer to control the thickness of the layer of frozen liquid formed on the interior surface of the bottom wall of the cup 19. With the thermoelectric heat pump employed in the illustrative embodiment, the rate of heat transfer is controlled by regulating the current flow through the heat pump: the higher the current level, the higher the rate of heat transfer.

To open the valve, the direction of current flow through the heat pump is reversed to transfer heat from the heat pump back into the bottom wall of the cup 19. This quickly melts the frozen liquid, thereby opening the gate region G to permit the free flow of liquid therethrough.

It will be appreciated that the temperature-controlled gate region G in the illustrative embodiment of FIGS. 1–3 can be formed in a variety of different configurations other than the particular configuration illustrated. For example, the gate region could have an annular shape with a flat exterior surface on one side thereof to facilitate the thermal coupling of the gate region to a heat pump of the type illustrated. Alternatively, an annular heat pump could be disposed around an annular gate region. Another possible configuration is a flat plate extending across the fluid flow path in a main conduit and having a plurality of apertures therein, with the plate also extending outside the conduit for coupling to the heat pump.

Turning next to FIGS. 4, 5 and 6, there is shown an alternative embodiment of the invention utilizing electrically controllable heating elements superimposed on a constant heat sink. This device controls the flow of fluid between a pair of conduits 40 and 41 formed in a cylindrical block 42 mounted within an upper housing 43. More specifically, fluid flow between the two conduits 40 and 41 is controlled by regulating the temperature within a pair of gate regions G1 and G2 adjacent the lower ends of the two conduits.

To pre-cool the fluid presented to the gate regions through either of the conduits 40 or 41, a refrigerent is passed into a cooling chamber 44 in the upper housing 43 through an inlet 45, exiting through an outlet 46. As mentioned above in connection with the embodiments of FIGS. 1–3, this pre-cooling of the fluid before it encounters the temperature-contolled gate region facilitates the freezing of liquid in the gate region in a minimum time interval.

The constant heat sink for both gate regions G1 and G2 is provided by a lower housing 50 which is cooled by a refrigerant passing through a cooling chamber 51 therein. The refrigerent enters the chamber 51 through an inlet port 52 and exits through an outlet port 53, and is preferably regulated to maintain the housing 50 at a temperature which is about 5 to 40 times as far below the freezing point of the liquid to be frozen as the temperature of the housing 43 is above that freezing point. That is, if the temperature of the housing 43 is $\Delta T°$ C. above the freezing point of the liquid, then the temperature of the housing 50 should be between $5\Delta T°$ and $40\Delta T°$ C. below the freezing point.

The cooling of the lower housing 50 also cools a substrate plate 60 mounted on the top of the housing 50. This substrate plate 60, which is typically made of alumina, carries a pair of circular electrical resistance heating elements 61 and 62 which are printed as thick films on the top surface of the substrate 60. If desired, the heating elements 61 and 62 may be printed directly on the top surface of the housing 50 which serves as the heat sink. A suitable material for the printed-film heating elements 61 and 62 is a silver-palladium-lead material with a resistivity of 2.8 ohms and a thickness of 0.04 mm.

The heating elements 61 and 62 are aligned with a pair of cylindrical sleeves 63 and 64 which are inserted in the lower end of the block 42 to form the lower ends of the conduits 40 and 41. A pair of leads 65 and 66 connect the heating elements 61 and 62 to a suitable electrical power supply so that the heating elements can be controllably energized to increase the temperature of the gate regions G1 and G2 sufficiently to melt frozen liquid therein, thereby opening the gate regions to permit fluid flow between the two conduits 40 and 41. Of course, the direction of fluid flow between the two conduits 40 and 41 depends on the relative pressures in the two conduits.

To minimize the transfer of heat between the upper housing 43 and the lower housing 50, a thermally insulating annulus 70 is disposed between the two housings, and the lower ends of the two sleeves 63 and 64 extend below the main body of the block 42 to increase the insulating air space between the top of the substrate 60 and the bottom of the block 42. In addition, thermally insulating rings 71 and 72 are secured to the lower ends of the sleeves 63 and 64 both to insulate against the transfer of heat from the sleeves 63 and 64 to the substrate 60 when the heating elements 61 and 62 are deenergized, and to insulate against the transfer of heat from the heating elements 61 and 62 to the sleeves 63 and 64 when the heating elements are energized. That is, whenever the heating elements 61 and 62 are energized, it is desirable to contain the maximum amount of heat within the gate regions G1 and G2 so as to melt the frozen liquid therein as quickly as possible.

Operation of the valve shown in FIGS. 4–6 can be controlled to a certain extent by adjusting the magnitude of electrical current fed to the heating elements G1 and G2. For example, the speed at which the valve opens increases with increasing current levels within a certain range of current values. Also, relatively low current levels can be used to open the valve only partially by melting only a portion of the frozen liquid in the gate region, while higher current levels open the valve completely by melting all the frozen liquid. If desired, heating elements can be provided on both sides of the gate regions G1 and G2, e.g., by providing additional heating elements on the lower ends of the sleeves 63 and 64.

In accordance with one specific aspect of the invention, there is provided a multi-port valve in which each port is in fluid communication with a primary temperature-controlled gate region; and selected groups of the primary gate regions are in direct fluid communication with each other, and in fluid communication with other groups of primary gate regions through secondary temperature-controlled gate regions. Thus, fluid flow may be permitted between different selected combinations of ports in the valve by opening different selected combinations of primary and secondary gate regions. One example of such a multi-port valve is shown in FIG. 7. This illustrative valve has 24 different ports, No. 1 through No. 24, each of which is in fluid communication with a primary gate region 80. Successive pairs of these gate regions 80, such as those associated with ports No. 1 and No. 2, No. 3 and No. 4, No. 5 and No. 6 etc., are in direct fluid communication with each other so that fluid may be passed between the two ports in any given pair by simply opening the two primary gate regions 80 associated therewith.

In addition, the direct-coupled pairs of gate regions 80 are in fluid communication with adjacent pairs of direct-coupled primary gate regions through 16 secondary temperature-controlled gate regions 81. These secondary gate regions 81 are identified as A through P in FIG. 7, and each of the gate regions 81 interconnects either a side wall 82 of the valve with an internal column 83, or a pair of internal columns 83. For example, the direct-coupled primary gate region 80 associated with the ports No. 1 and No. 2 communicate with the primary gate regions associated with the adjacent direct-coupled pair of ports No. 3 and No. 4 through the secondary gate region A, and with the primary gate regions associated with the adjacent pair of ports No. 5 and No. 6 through the secondary gate region B. Thus, fluid communication between the ports No. 1 and No. 5 may be effected by opening the primary gate regions 80 associated with the ports No. 1 and No. 5 and the secondary gate region B. It will readily be seen that fluid communication may be effected between a myriad of different combinations of ports by opening only selected primary and secondary gate regions.

Although the multi-port valve has been illustrated in somewhat schematic form in FIG. 7, it will be understood that each of the primary and secondary gate regions 80 and 81 comprises a printed-film electric resistance heater of the type described above and illustrated in FIGS. 4 through 6. All these heating elements may be printed on a common substrate 84 mounted on a common heat sink maintained at a temperature well below the freezing point of the liquid to be controlled. The fluid ports Nos. 1–24, as well as the external walls 82 and the internal columns 83 of the valve, may all be formed in a common head block corresponding to the block 42 in FIGS. 4 through 6. Thus, it can be seen that the entire multi-port valve may be formed formed from a small number of parts which can be economically manufactured, particularly when the fluid flow rates to be controlled by the valve are relatively small.

To control the opening and closing of the primary and secondary gate regions 80 and 81 in the valve of FIG. 7, each gate region is connected to one of a series of electrical leads 85 projecting from one side of the valve and extending inwardly along or through the substrate 84 to the heating elements forming the various gate regions. When it is desired to open one or more of the gate regions 80 and 81, power is supplied to the appropriate leads 85 to melt the frozen liquid within the selected gate regions. To close the gate regions, the electrical heating elements are de-energized, and the cooling effect of the heat sink beneath the heating elements quickly freezes the liquid in the gate regions.

While the invention has been described with particular reference to the use of this invention in controlling the flow of liquids, the invention is also capable of controlling flow of gases. The liquid that must be frozen in the gate region to close the valve may be condensed out of the gas that is being controlled, as in the case of water vapor or steam for example, or a small amount of liquid may be injected into the gate region when it is desired to close the valve and then later vaporized into the gas stream when the valve is opened. For rapid closing of the valve when controlling gas flow, it is generally necessary to inject a slug of liquid into the gate region. In applications where the introduction of foreign vapors into the gas stream is prohibited, liquid gallium may be introduced into the gate region and frozen therein. Gallium has a melting point of 29.8° C., a boiling point of 2344° C., and a vapor pressure of 10$^{-35}$ torr. at its melting point, which means that entrainment of gallium in the gas stream being controlled will always be negligible. When the valve is opened, the liquid gallium can be withdrawn to a small reservoir for re-use the next time the valve is to be closed.

We claim as our invention:

1. A fluid flow control device comprising the combination of a thermally conductive conduit section having both interior and exterior heat exchange surfaces, said interior heat exchange surface being adapted to contact fluid flowing thereover, means for pre-cooling liquid approaching said conduit section to a temperature only slightly above the freezing point of said liquid, and controllable heat transfer means coupled to said conduit section and having a first operative state for removing heat from said exterior heat exchange surface to reduce the temperature of said conduit section sufficiently to freeze liquid adjacent said interior heat exchange surface and thereby at least partially restrict the flow of fluid thereover, and a second operative state for applying heat to said interior heat exchange surface to melt at least a portion of any frozen liquid adjacent said interior heat exchange surface and thereby permit the flow of fluid thereover.

2. A fluid flow control device comprising the combination of a thermally conductive conduit section having both interior and exterior heat exchange surfaces, said interior heat exchange surface being adapted to contact fluid traversing said conduit section, means for pre-cooling liquid approaching said conduit section, a heat sink coupled to said exterior heat exchange surface and maintained at a temperature substantially below the freezing point of a liquid flowing thereover for freezing said liquid adjacent said interior heat exchange surface and thereby at least partially restricting the flow of fluids thereover, and controllable heating means for heating the liquid adjacent said interior heat exchange surface to a temperature above the freezing point of said liquid to melt at least a portion of any frozen liquid adjacent thereto and thereby permit fluid flow thereover.

* * * * *